United States Patent [19]
Lindholm

[11] Patent Number: 5,859,982
[45] Date of Patent: Jan. 12, 1999

[54] COMPUTER SYSTEM AND METHOD FOR EXECUTING METHODS OF DOWNLOADED PROGRAMS WITH REDUCED RUN-TIME MEMORY SPACE REQUIREMENTS

[75] Inventor: Timothy G. Lindholm, Palo Alto, Calif.

[73] Assignee: Sun Microsystems, Inc., Palo Alto, Calif.

[21] Appl. No.: 658,472

[22] Filed: Jun. 5, 1996

[51] Int. Cl.[6] .................................................. G06F 9/00
[52] U.S. Cl. ........................... 395/200.77; 395/200.76; 395/200.8; 395/200.83; 395/200.33
[58] Field of Search .................. 395/200.77, 200.76, 395/200.8, 200.33, 200.83; 364/DIG. 1

[56] References Cited

U.S. PATENT DOCUMENTS

| | | | |
|---|---|---|---|
| 5,307,413 | 4/1994 | Denzer ........................................ | 380/49 |
| 5,347,632 | 9/1994 | Filepp et al. ............................. | 395/200 |
| 5,497,494 | 3/1996 | Combs et al. ............................ | 395/750 |
| 5,682,550 | 10/1997 | Brown et al. ........................... | 395/830 |
| 5,734,822 | 3/1998 | Houla et al. ........................... | 395/200.6 |

*Primary Examiner*—Alyssa H. Bowler
*Assistant Examiner*—Dzung Nguyen
*Attorney, Agent, or Firm*—Stephen M. Knauer; Flehr Hohbach Test Albritton & Herbert LLP

[57] ABSTRACT

A client computer system and associated method in a computer network over which are provided programs with methods. The client computer is capable of executing the programs with reduced run-time memory space requirements. Specifically, a network communications interface receives the methods of the programs and a network communications manager loads uncompressed in available space in the run-time memory the methods when they are received. An execution controller controls execution of the programs so that the methods are invoked and not invoked at various times during execution of the programs. A compressor compresses in the memory compressible ones of the uncompressed methods that are not invoked so that space is made available in the run-time memory. The compressor also decompresses in available space in the run-time memory decompressible ones of the methods so that they may be invoked.

33 Claims, 6 Drawing Sheets

COMPUTER SYSTEM AND METHOD FOR EXECUTING METHODS OF DOWNLOADED PROGRAMS WITH REDUCED RUN-TIME MEMORY SPACE REQUIREMENTS

The present invention relates to computer systems and methods for executing programs with reduced run-time memory space requirements. In particular, the present invention pertains to computer systems and methods in a network for executing code transmitted over the network (i.e., network mobile code) so that the run-time memory space requirements of the code is reduced.

BACKGROUND OF THE INVENTION

Computer systems are now being built or configured to take advantage of properties of programs whose code is in an architecture neutral (AN) binary format, hereinafter referred to as AN code. Thus, the AN code of these programs is independent of the specific architecture or platform of the computer system.

The term architecture is defined for the purposes of this document to mean the operating characteristics of a family of computer models. Examples of specific architectures include Macintosh computers, IBM PC compatible computers using the DOS or Windows operating systems, Sun Microsystems computers running the Solaris operating system, and computer systems using the Unix operating system.

The term architecture specific (AS) is defined for the purposes of this document to refer to the requirement that the code of certain programs be in a binary format, hereinafter referred to AS code, for execution only on computer systems with a specific computer architecture. Thus, programs with code written in a conventional programming language (e.g., C language) and compiled for a specific architecture (e.g., IBM compatible PC) can only run on that architecture or emulators of that architecture.

The term architecture neutral (AN) is defined for the purposes of this document to refer to programs whose compiled code can be executed on a variety of computer systems with different architectures. For example, a computer system with a specific architecture can be configured with a Java (a trademark of Sun Microsystems) virtual machine module. The Java virtual machine module enables execution of programs with code written in the Java programming language and compiled into bytecode, hereinafter referred to as Java bytecode, for the instruction set of the Java virtual machine. Java bytecode is independent of the specific architecture of the computer system.

Important features of programs with AN code include their portability. For example, since programs in AN code can be executed on any computer system configured to execute the AN code regardless of the computer system's specific architecture, these programs can be easily transported over a network from one computer system to another. For example, programs compiled into Java bytecode can be executed on any computer system with a Java virtual machine module and can be easily transported over a network from one computer system to another using a HotJava (a trademark of Sun Microsystems) network communications manager.

Furthermore, another important feature related to the portability of programs compiled into Java bytecode is the verifiability of such programs.

Specifically, the Java virtual machine module can easily verify that these programs satisfy predefined integrity criteria. Such integrity criteria include stack and data type usage restrictions that ensure that Java bytecode cannot overflow or underflow the Java virtual machine module's stack and that all instructions in Java bytecode utilize only data whose data type matches the data type restrictions for those instructions. As a result, a program in Java bytecode cannot forge object pointers and generally cannot access system resources other than those which the user has explicitly granted it permission to use.

For these reasons, computer systems are being configured for execution of programs in AN code that are received over a network. In fact, in some cases, such computer systems may not even require a secondary memory (e.g., a hard disk) since the programs are loaded directly into the run-time (i.e., execution-time) memory (e.g., random access memory (RAM)) of the computer system. As a result, the user of such a computer system is freed from the cycle of software purchase, installation, configuration and upgrade that is currently typical of software products.

The just described features of AN code make it particularly attractive for use with small or cheap computer systems that are networked and are loaded with AN code on demand. For example, these kinds of computer systems may be video games, personal digital assistants (PDAs), cellular phones, or other similar computer systems or computer operated devices.

Unfortunately, however, programs in AN code run slower than the same programs in AS code. For example, programs in Java bytecode executed by a Java virtual machine module typically run 2.5 to 20 times as slow as the equivalent program in AS code. Thus, a user of a computer system may find it desirable to receive over a network AS code of a program so that the AS code can be executed on the specific architecture of the computer system. However, to ensure that these programs are securely shipped to a computer system, the network would have to be closed or trusted or these programs have to have embedded digital signatures which can be verified.

Moreover, AS code which has been generated from AN is much larger than the original AN code. For example, AS code generated from Java bytecode is typically 2 to 5 times the size of the Java bytecode. Thus, a fixed amount of run-time memory can hold substantially less compiled AS code than AN code. However, as mentioned previously, AS code is much faster than AN code from which it is generated and may be the only way to achieve adequate performance.

In the just described computer systems, price is extremely important. In practice, one of the most significant costs in building such computer systems is the amount of run-time memory that is required for execution of loaded programs. It is therefore very important to reduce the amount of run-time memory required by these computer systems since such a reduction produces a strong competitive advantage.

Furthermore, in the computer systems of the type described above, it may not be possible to page to secondary memory. In this case, the AN or AS code received over a network could be cached in the run-time memory and flushed when its space in the run-time memory is required. However, when execution of the flushed program is to be continued, the original code must again be downloaded over the network. This significantly affects the execution speed of the program. Furthermore, even in computer systems where it is possible to page to secondary memory, the time required to retrieve the code from the secondary memory may be too costly.

In the present invention, compression and then decompression of the code of a program received over a network is used to reduce the storage cost of the code in the run-time memory. Since this is much faster than flushing code and retrieving it, the execution speed of the code is not significantly affected by compression and decompression.

SUMMARY OF THE INVENTION

In summary, the present invention is a client computer system and associated method in a computer network over which are provided programs with methods. The client computer is capable of executing the programs with reduced run-time memory space requirements. The client computer system comprises a run-time memory, a communications interface, a network communications manager, an execution controller, and a compressor.

The network communications interface receives the methods of the programs and the network communications manager loads uncompressed into available space in the run-time memory the methods when they are received. The execution controller controls execution of the programs so that the methods are invoked and not invoked.

The compressor compresses in the run-time memory compressible ones of the compressed programs that are not invoked. As a result, space is made available in the run-time memory. The compressor also decompresses in available space in the run-time memory decompressible ones of the compressed methods so that they may be invoked.

In one embodiment, the compressor decompresses the decompressible ones of the compressed methods as soon as they are invoked.

In another embodiment, the compressor decompresses the decompressible ones of the compressed methods after a predetermined time interval.

In still another embodiment, the compressor compresses the compressible ones of the uncompressed methods as soon as they are no longer invoked.

In yet another embodiment, the compressor compresses the compressible ones of the uncompressed methods when space in the run-time memory is needed but not available. Moreover, in this embodiment, the client computer system may further comprise a least recently invoked list that lists those of the methods that are currently not invoked in order of least recently invoked method to most recently invoked method. As a result, the compressible ones of the uncompressed methods are the least recently invoked methods In the least recently invoked list when space in the run-time memory is needed but not available.

In yet still another embodiment, the compressor flushes from the run-time memory flushable ones of the compressed methods when space in the run-time memory is needed but not available.

As an alternative to the previous embodiment, the client computer system may further comprise a secondary memory. In this case, the compressor stores in the secondary memory storable ones of the compressed methods when space in the run-time memory is needed but not available. Then the compressor retrieves from the secondary memory retrievable ones of the compressed methods that are to be decompressed.

BRIEF DESCRIPTION OF THE DRAWINGS

Additional goals and features of the invention will be more readily apparent from the following detailed description and appended claims when taken in conjunction with the drawings, in which:

DETAILED DESCRIPTION OF THE INVENTION

Figure 1:
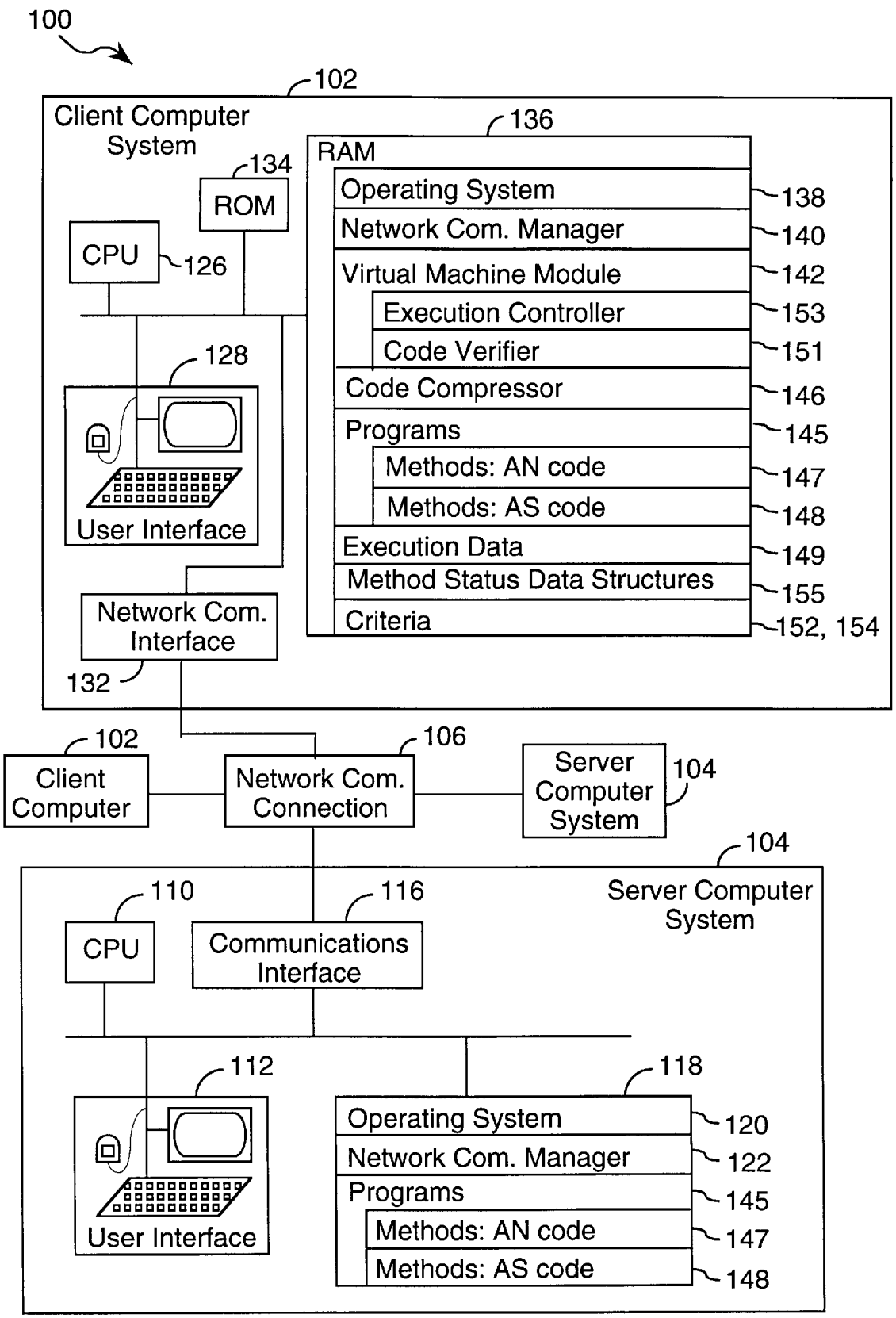
FIG. 1 is a block diagram of a client computer system incorporating the present invention.

Referring to FIG. 1, there is shown a computer network 100 in accordance with the present invention. It includes one or more client computer systems 102, one or more server computer systems 104, and a network communications connection 106.

The client computer systems 102 are connected to the server computer systems 104 via the network communications connection 106. The network communications connection may be a local or wide area network, the Internet, or some other type of network communications connection.

Each server computer system 104 includes a central processing unit (CPU) 110, a user interface 112, a network communications interface 116, and a memory 118. The network communications interface enables each server computer system to communicate with the client computer systems 102 via the network communications connection 106.

The memory 118 of each server computer system 104 stores an operating system 120, a network communications manager (or server) 122, and programs 145. The operating system and communications manager are all run on the CPU 120. The operating system controls and coordinates running of the network communications manager in response to commands issued by a user with the user interface 112 or received by the network communications interface 116 via the network communications connection 106 from users of the client computer systems 102.

The programs 145 comprise methods 147 and/or 148. For purposes of this document, any discrete fragment or portion of a program that is invoked and not invoked at various times during the execution of the program is considered a method.

The methods 147 of each server computer system 104 contain architecture neutral (AN) code that is independent of the specific architecture (i.e., platform) of the client computer systems 102. These programs are compiled from a specific programming language into the AN code. In the preferred embodiment, these programs are written in the Java programming language and compiled into Java bytecode. Moreover, these programs are included in object classes with methods that form software programs which are programmed in an object-oriented manner.

On the other hand, the methods 148 of each server computer system contain architecture specific (AS) code that is compiled for the specific architecture of the client computer systems 102. As alluded to earlier, these kinds of methods are desirable in that they run faster than the same methods in AN code. As will be explained in greater detail later, it is preferred that the network 100 be a closed and trusted network in which these programs may be securely shipped to the client computers 102 with a high degree of confidence or that these programs have embedded digital signatures which can be verified.

As will also be explained in more detail later, the methods 147 and/or 148 are transmitted upon user request to the client computer systems 102 using the network communications manager 122. Thus, the code of these methods is considered network mobile code.

Each client computer system 102 may be a video game, a personal digital assistant (PDA), a cellular phone, desktop computer, or other computer system or computer operated device which requires a small amount of run-time memory. Furthermore, each client computer system includes a central processing unit (CPU) 126, a user interface 128, a network communications interface 132, a read only memory (ROM) 134, and a run-time random access memory (RAM) 136. The network communications interface enables the client computer system to communicate with the server computer systems 104 via the network communications connection 106.

The RAM 136 of each client computer system 102 stores an operating system 138, a network communications manager 140, a virtual machine module 142, and a code compressor 146 that have all been loaded from the ROM 134. The RAM also stores the programs 145 with methods 147 containing AN code and/or methods 148 containing architecture specific (AS) code that have been downloaded from the server computer systems 104. The operating system, network communications manager, virtual machine module, compiler, compressor, and programs are all executed on the CPU 126. The operating system controls and coordinates execution of the network communications manager, virtual machine module, code compiler, code compressor, and programs in response to commands issued by a user with the user interface 128.

As alluded to earlier, the methods 147 and/or 148 are received from the server computer systems 104 upon user request. These methods are obtained using the network communications manager 122 which is, in the preferred embodiment, a HotJava network communications manager. The network communications manager then loads these methods in the RAM 136.

The code verifier 151 of the virtual machine module 142 verifies that the AN code of the loaded methods 147 meets predefined integrity criteria. As mentioned earlier, this may include stack and data type usage restrictions to ensure that loaded methods cannot overflow or underflow the virtual machine module's stack and that all instructions utilize only data whose data type matches the data type restrictions for those instructions. In the preferred embodiment, the virtual machine module is a Java virtual machine module.

However, in the case of the received methods 148 with AS code, the code verifier 151 cannot be used to directly verify their integrity. Thus, to verify their integrity indirectly, the network 100 may be a closed and trusted network in which these methods may be securely shipped to the client computers 102 with a high degree of confidence. Alternatively, if the network 100 is not secure, these programs may have embedded digital signatures which enable the network communications manager 140 to verify that they are from a trusted source.

The execution controller 153 of the virtual machine module 142 controls execution of the programs 145. In particular, the execution controller interprets the AN code of the methods 147 for execution on the specific architecture of the client computer system 102 and enables these methods to call the methods 148 containing AS code for execution on the specific architecture. The execution 149 data generated during the execution of the programs is stored in the RAM 136. In addition, if the network communications manager 140, code compiler 144, and/or code compressor 146 are in AN code, then the execution controller controls execution of them as well.

Furthermore, in order to keep the RAM space requirements of the client computer system 102 low, the code compressor 146 compresses and decompresses in the RAM 136 the code of the methods 147 and/or 148 at various times. This is done for the methods that are compressible and decompressible because they respectively satisfy predefined compression and decompression criteria 152 and 154 that are stored in the RAM 136 and inputted by the user with the user interface 128. The compression and decompression criteria are more fully described later and are, in some embodiments of the present invention, user selectable and/or tunable (using the user interface 128) from a set of predefined memory management strategies.

The storage and invocation status of the methods 147 and/or 148 is maintained with the method status data structures 155. The method status data structures are updated by the network communications manager 140, the execution controller 153, and the code compressor 146.

Figure 2:
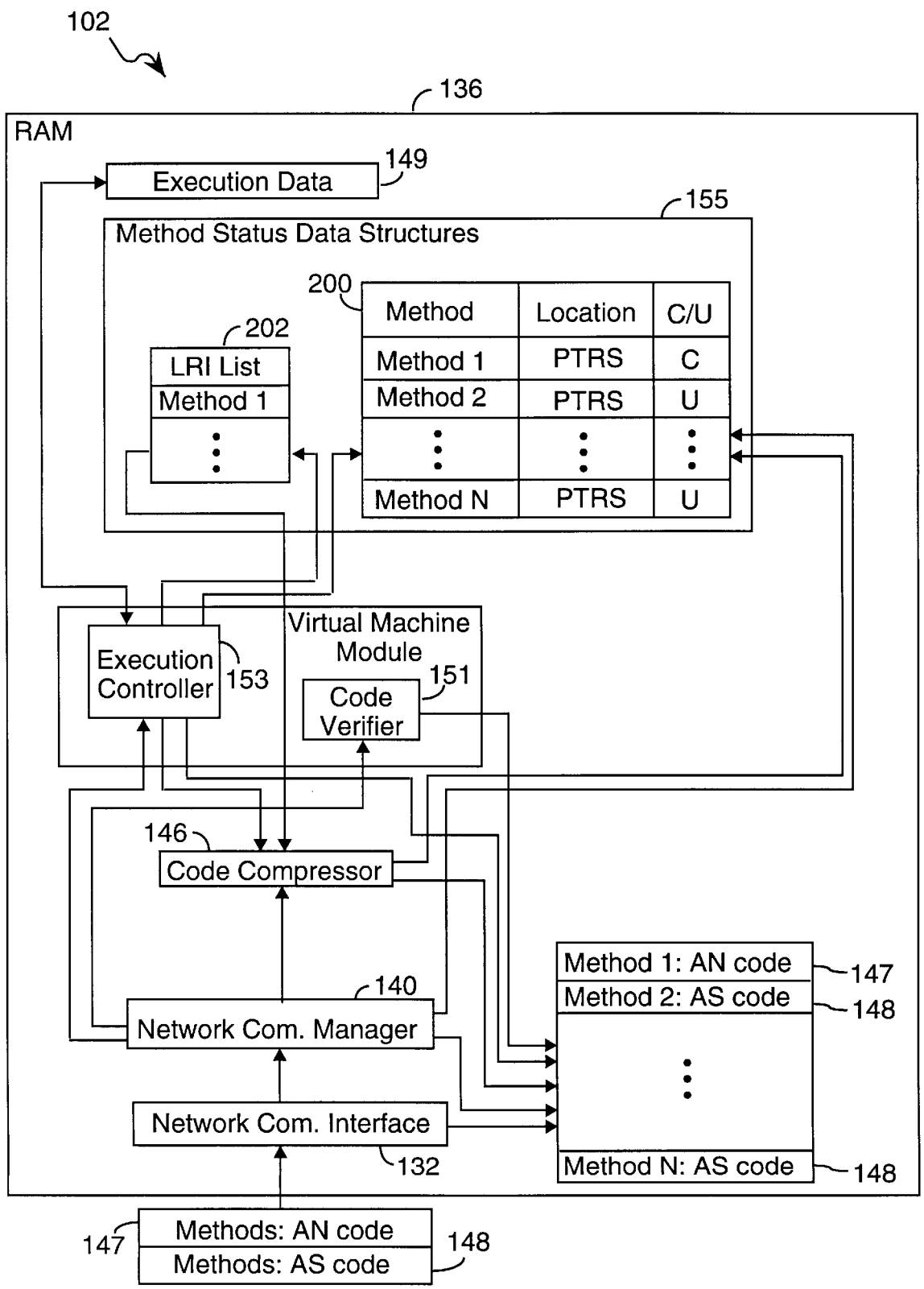
FIG. 2 is a functional block diagram of the operation of the client computer system.

FIG. 2 shows a functional block diagram of the operation of each of the client computer systems 102 in compressing and decompressing in the RAM 136 the methods 147 and/or 148. In addition, FIGS. 3 and 4 respectively show the preferred compression and decompression methods 300 and 400.

Figure 3:
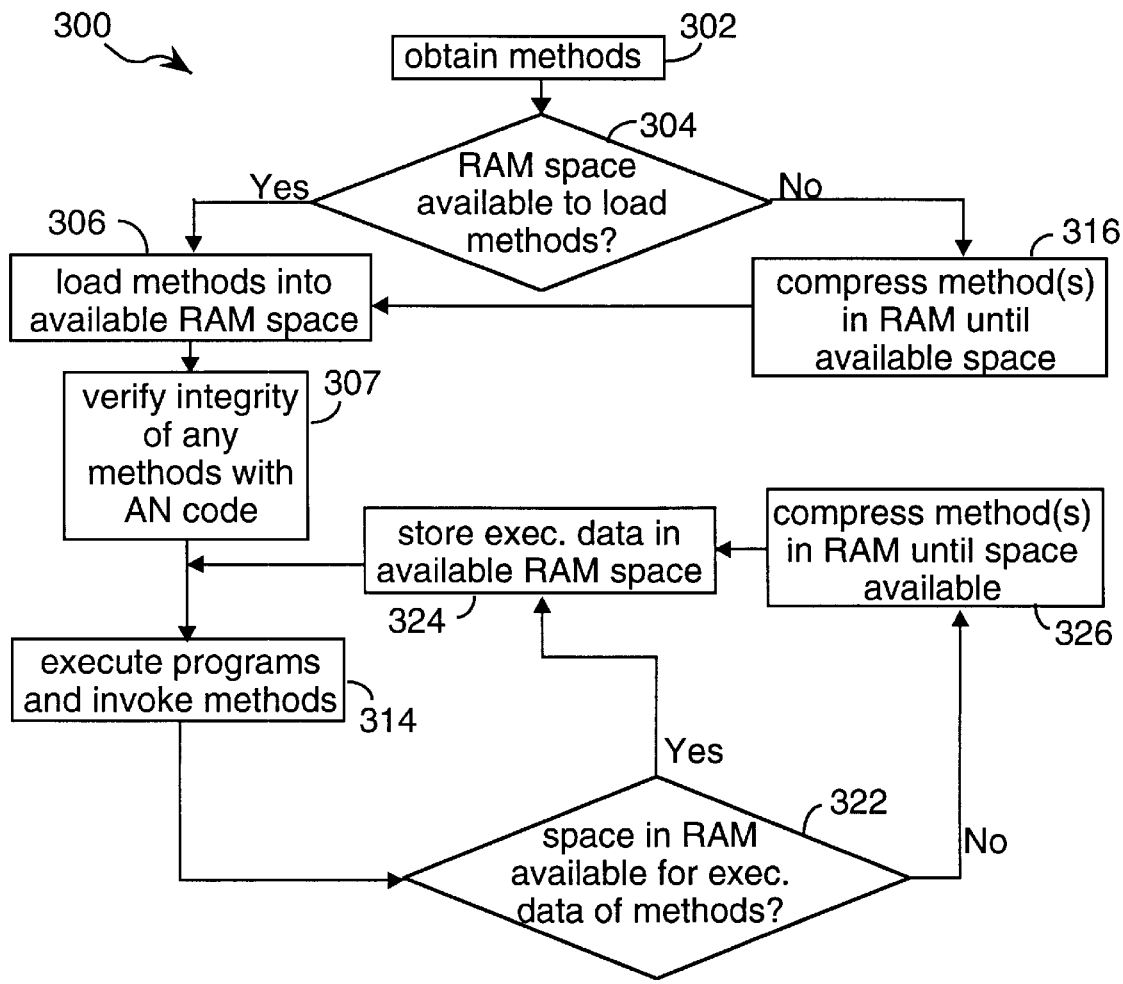
FIG. 3 is a flow chart of the compression method of the client computer system.

Referring to FIGS. 1–3, when a user requests execution of one of the programs 145 of one of the server computer systems 104, the user's client computer system 102 obtains the requested program from the server computer system (step 302 of FIG. 3). This is done when the user issues a command with the user interface 128 to download and execute the program from the server computer system. In response, the operating system 120 calls the network communications manager 140 which generates a message indicating that such a request has been made. The network communications interface 132 then transmits the message to the server computer system.

The network communications interface 116 of the server computer system 104 receives the transmitted message. In response, the network communications manager 122 of the server computer system provides the methods 147 and/or 148 of the requested program 145 to the network communications interface which then transmits the methods to the user's client computer system 102.

The methods 147 and/or 148 that were transmitted are received by the network communications interface 132 of the user's client computer system 102. In response, the network communications manager 140 then determines if enough space in the RAM 136 is available for loading the received methods (decision step 304 of FIG. 3). If there is, then the network communications manager loads the code of these methods uncompressed into the available space in the RAM (step 306 of FIG. 3). As a result, these methods are loaded into the RAM along with previously loaded programs methods 147 and/or 148 of other programs 145. In loading these methods, the network communications manager updates the method storage status table 200 of the method status data structures 155 to identify the methods and the corresponding pointers to the memory spaces in the RAM 136 occupied by these methods. Furthermore, the network communications manager updates the program status table to indicate that the code of the methods is uncompressed (U).

The network communications manager 140 than invokes the code verifier 151 of the virtual machine module 142. In response, the code verifier verifies that the AN code of any methods 147 that were just loaded meets the predefined integrity criteria discussed earlier (step 307 of FIG. 3).

The program 145 whose methods 147 and/or 148 were just loaded is then executed under the control of the execution controller (step 314 of FIG. 3) along with any previously loaded programs. As the programs are executed, their methods are invoked and not invoked at various times during their execution. As mentioned previously, the execution controller interprets the AN code of the methods 147 for execution on the specific architecture of the user's client computer system 102 and enables these methods to call the methods 148 containing AS code for execution on the specific architecture.

Each of the loaded methods 147 and/or 148 may not be invoked at various times because it may have to wait for data, may have been put to sleep, etc . . . When the execution controller determines that this has occurred, it adds the method to the least recently invoked (LRI) list 202 of the program status data structures 155 to indicate that it is currently not invoked. The methods in the LRI list are listed from most recently invoked to least recently invoked.

As indicated earlier, in order to reduce the space requirements of the RAM 136, the code of each loaded method 147 and/or 148 for which the predefined compression criteria 152 is satisfied is compressed by the code compressor 146. In the preferred embodiment, the compression criteria specifies that the code of a compressible method 147 or 148 be compressed at the time when (1) space in the RAM 136 is needed but not available, and (2) the method is the least recently invoked method in the LRI list 202 that has not yet had its code compressed.

When the network communications manager 140 determines that space in the RAM 136 is not available to load one or more of the methods 147 and/or 148 received by the server computer systems 104 (decision step 304 of FIG. 3), then it invokes the code compressor 146. In response, the code compressor compresses the code of the least recently invoked method(s) in the LRI list 202 whose code has not yet been compressed until enough space has been made available (step 316 of FIG. 3). The code compressor also updates the method storage status table 200 to identify the corresponding pointer(s) to the memory space(s) of the compressed code of the method(s) and to indicate that the code of the method(s) has been compressed (C). The network communications manager then loads the method(s) for which space has been made available into the available space, as described earlier (step 306 of FIG. 3).

The code compressor 146 may use any fast data compression technique well known to those skilled in the art. Moreover, the code compressor may use separate compression techniques for optimal compression of the AN code of the methods 147 and the AS code of the methods 148.

Furthermore, while the loaded methods 147 and/or 148 are invoked, they generate execution data. For any of these methods which the execution controller 153 determines is invoked (decision step 320 of FIG. 3) and for which space in the RAM 136 is available to store execution data (decision step 322), the execution controller stores the execution data in the RAM (step 324 of FIG. 3).

However, for each of the loaded methods 147 and/or 148 which the execution controller 153 determines is invoked (decision step 320 of FIG. 3) and for which space in the RAM is not available but needed to store execution data (decision step 322), the execution controller invokes the code compressor 146. As in the earlier situations where space in the RAM is needed, the code compressor compresses the code of the least recently invoked method(s) in the LRI list 202 whose code has not yet been compressed until enough space has been made available (step 326 of FIG. 3). And, as described earlier, the code compressor updates the method storage status table 200 to identify the corresponding pointer(s) to the memory space(s) of the compressed code of the method(s) and to indicate that the code of the method(s) has been compressed (C). The execution controller then stores the execution data in the space made available in the RAM (step 324 of FIG. 3), as described earlier, and execution of the program with the method(s) whose execution data was stored continues (step 314 of FIG. 3).

Figure 4:
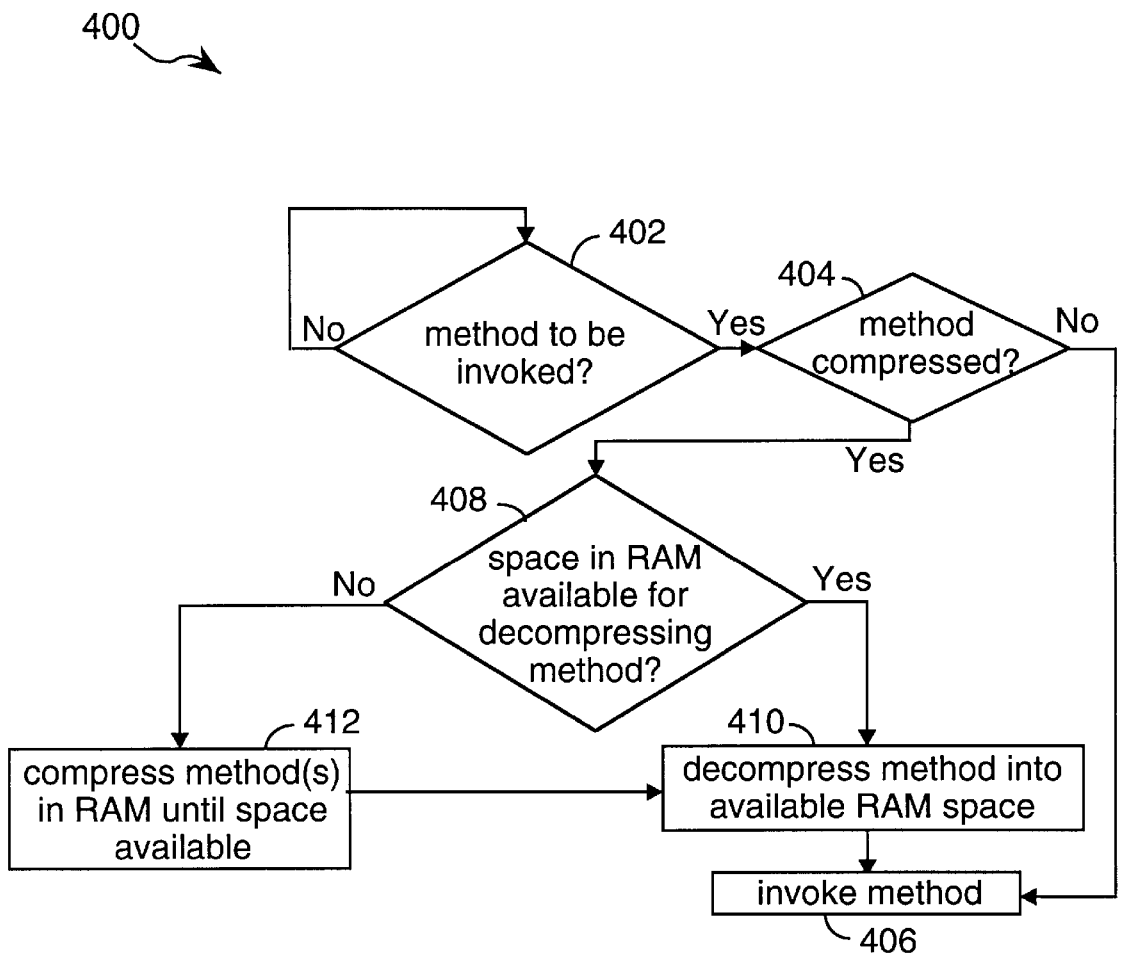
FIG. 4 is a flow chart of the decompression method of the client computer system.

Moreover, referring to FIGS. 1, 2, and 4, when space in the RAM 136 is available, each loaded method 147 and/or 148 that is compressed and for which the predefined decompression criteria 154 is satisfied is decompressed by the code compressor 146. In the preferred embodiment, the predefined decompression criteria 154 for decompressing a decompressible method' s code simply specifies that the code of the method is compressed and is to be decompressed at the time when the method is to be invoked again.

Thus, whenever the execution controller 153 determines that one of the loaded methods 147 and/or 148 is to be invoked (decision step 402 of FIG. 4), it determines whether the code of this method is compressed (decision step 404 of FIG. 4). This is determined from the method storage status table 200. If the method's code isn't compressed, then the method is invoked by the execution controller (step 406 of FIG. 4). When it is no longer invoked, its code may be compressed by the code compressor 146 in the manner described earlier.

However, if the code of the method 147 or 148 that is to be invoked is compressed, then the execution controller invokes the code compressor 146 to decompress the method's code. The code compressor determines if there is enough space available in the RAM 136 to decompress the code (decision step 408 of FIG. 4). If there is enough space available, the code compressor decompresses the code in the available space (step 410 of FIG. 4). In doing so, it updates the method storage status table 200 to identify the corresponding pointer(s) to the memory space(s) of the uncompressed code and to indicate that the method's code is now uncompressed (U).

However, if there is not enough space available, then the code compressor 146 compresses the code of the least recently executed method(s) in the LRI list 202 whose code has not yet been compressed until space has been made available (step 412 of FIG. 4). This is done in the manner described earlier. After the space has been made available, the code of the method 147 or 148 that is to be decompressed is decompressed by the code compressor in the available space and then invoked by the execution controller 153 in the manner just described (steps 410 and 406 of FIG. 4).

In view of the foregoing, it is clear that the present invention provides a reduction in run-time memory space while saving execution speed. This is due to the fact that by compressing the loaded methods 147 and/or 148, they do not need not be flushed from the RAM 136 and re-downloaded from the server computer systems 104 when space in the RAM is needed. However, as those skilled in the art will recognize, other alternative embodiments could be implemented to provide similar benefits.

Specifically, the compression criteria 152 described earlier specified that the code of least recently executed methods 147 and/or 148 with uncompressed code would be compressed when space in the RAM 136 was needed but not available. However, the compression criteria may be selected by the user from a broad range of options and based on a number of conditions specific to the user's client computer system 102. For example, the compression criteria may simply specify that the code of each method is to be compressed as soon as the method is no longer invoked. Or, it may specify that the code of certain methods is to be compressed lazily whenever time is available for doing so. As an additional variation of any of the foregoing, the compression criteria may specify that only the code of methods of a specific size or type is to be compressed.

Moreover, as was stated earlier, the decompression criteria 154 specified that a method 147 or 148 whose code is compressed code would have its code decompressed as soon as the method was to be invoked. However, the decompression criteria could specify that the compressed code be decompressed after a predetermined time interval has expired. In this case, the data compressor would include a timer to time the time interval. In one example, this technique could be used for a method that is being put to sleep for a known time interval so that the method will be compressed for this time interval and then decompressed just prior to when it is to be awakened. Or, in another example, the technique could be used for a method that is waiting for data where the time interval over which the method is compressed would be selected so as to predict when the data will become available for the method.

In another embodiment, the compression criteria 152 may also include flushing criteria specifying when the loaded methods 147 and/or 148 are to be flushed from the RAM 136. For example, the flushing criteria may indicate that if there are no more loaded methods in the RAM that are not invoked and uncompressed, then the least recently executed method(s) in the LRI list 202 with compressed code are flushable and are to be flushed from the RAM 136 until enough space is made available. As a result, when a method is flushed from the RAM and then is to be executed again, the network communications manager 140 must re-download the program from the server computer system 104 that supplied the program in the manner discussed earlier. The execution controller 153 updates the program storage status table 200 by removing reference to any flushed methods.

Figure 5:
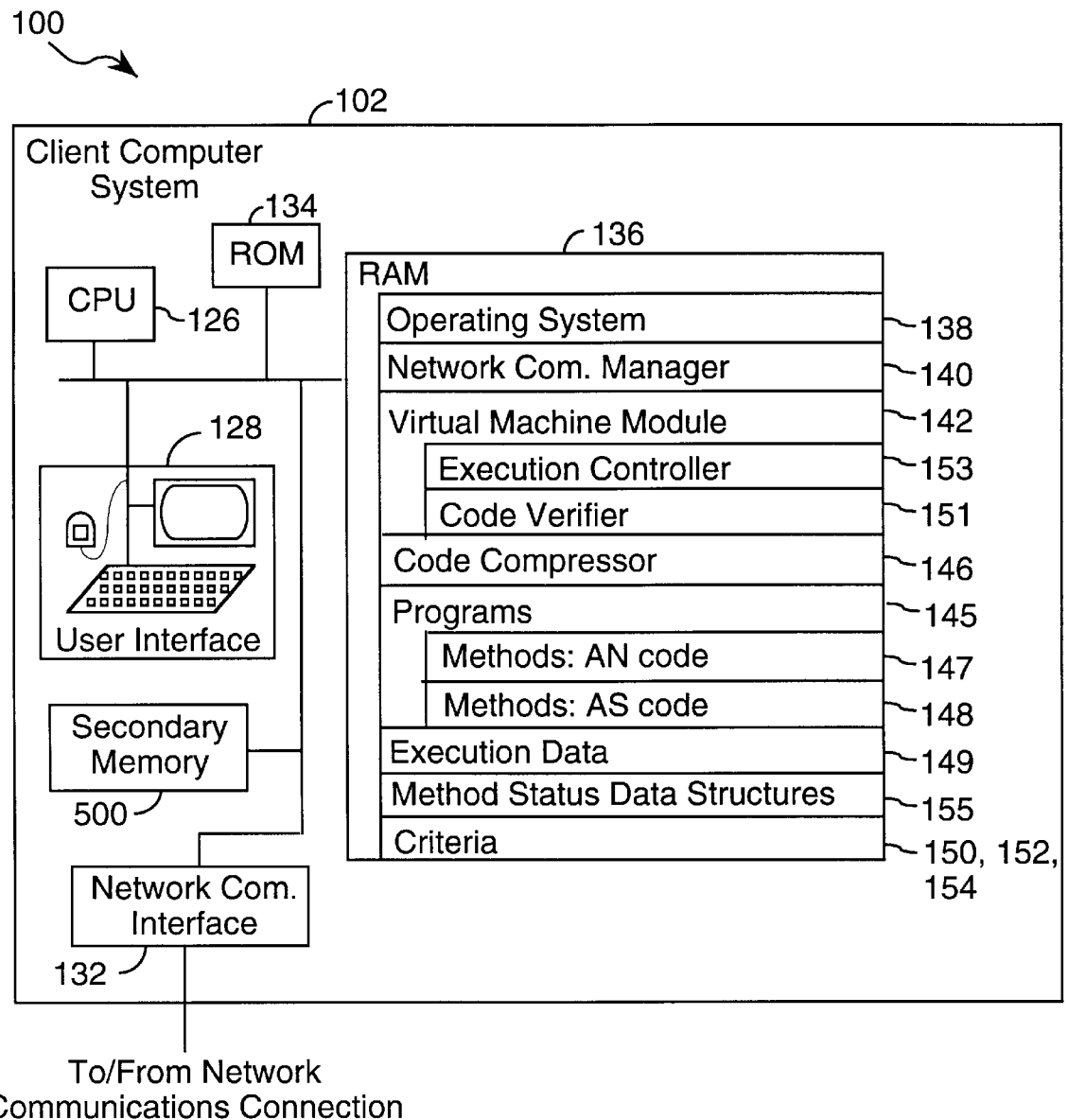
FIG. 5 shows an alternative embodiment of the client computer system.
Figure 6:
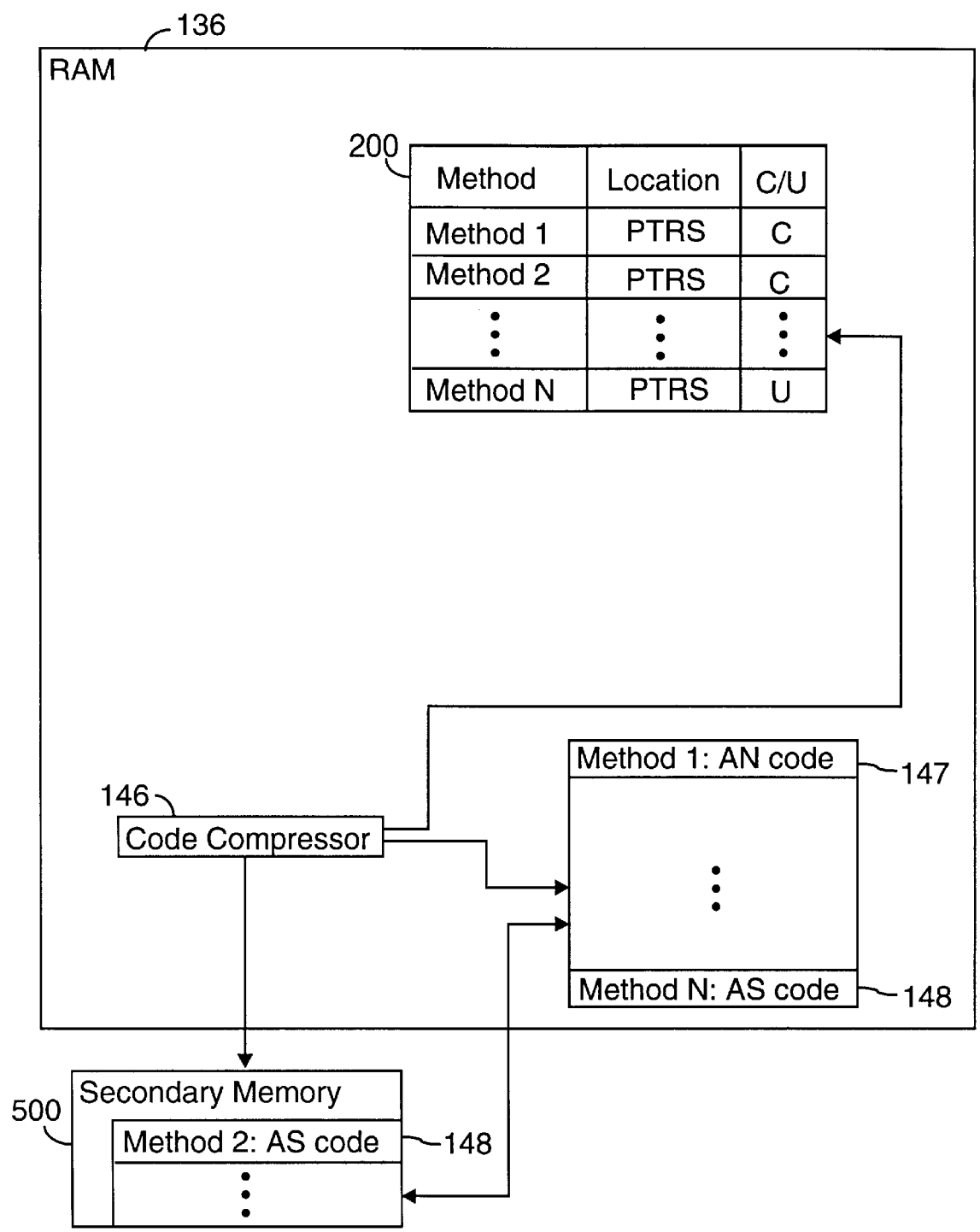
FIG. 6 shows a functional block diagram of the operation of the alternative embodiment of the client computer system.

Since flushing loaded methods 147 and/or 148 from the RAM 136 is costly in terms of execution speed, a secondary memory 500 could be used to store the methods that would otherwise be flushed, as shown in FIGS. 5 and 6. In this case, the compression criteria 152 discussed earlier would include secondary storage criteria that would be similar to the flushing criteria just discussed and used to store methods that are storable because they satisfy the secondary storage criteria. However, in this case, the code compressor 146 would update the pointers in the program storage status table 200 to point to these methods in the secondary memory. Furthermore, for the methods that are retrievable in that their code is compressed, stored in the secondary memory, and is to be decompressed, the code of the methods would be retrieved from the secondary memory and then decompressed in the RAM 136 in the manner described earlier.

Moreover, in an embodiment where the client computer system 102 includes a secondary memory 500 (e.g. a networked desktop computer), the methods 147 and/or 148 could be downloaded from the server computer systems 104 to the secondary memory. Then, these methods could be loaded directly into the RAM 136 from the secondary memory rather then from the server computer systems 104. Additionally, in such an embodiment, the operating system 138, the network communications manager 140, the virtual machine module 142, and the code compressor 146 could be stored in the secondary memory and loaded from there into the RAM.

In still another embodiment, the operating system 138, the network communications manager 140, the virtual machine module 142, and the code compressor 146 could be downloaded from one of the server computer systems 104 into the RAM 136 of the client computer system 102. This would be done in a similar manner as that described earlier for the methods 147 and/or 148 of a server computer system.

In yet another embodiment, the virtual machine module 142 is actually implemented in a silicon chip and serves as the CPU 126 of the client computer system 102. In this case, the methods 147 with AN code are not interpreted for a specific architecture and are instead executed directly. In this embodiment, methods 148 with AS code would not be utilized.

Finally, while the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. In a computer network over which is provided programs with methods, a client computer system for executing the programs with reduced run-time memory space requirements, the client computer system comprising:

a run-time memory;

a network communications interface that receives the methods;

a network communications manager that loads the methods into available space in the run-time memory when the methods are received;

an execution controller that controls execution of the programs, whereby each of the methods is invoked and not invoked at different times;

a compressor that (A) compresses in the run-time memory a selected method of the methods when the selected method is not invoked and not compressed, whereby space is made available in the run-time memory, and (B) decompresses into available space in the run-time memory the selected method when the selected method is compressed so that the selected method may be invoked.

2. The client computer system of claim 1 wherein the compressor decompresses the selected method as soon as the the selected method is to be invoked.

3. The computer system of claim 1 wherein the compressor decompresses the selected method after a predetermined time interval.

4. The client computer system of claim 1 wherein the compressor compresses the selected method as soon as the selected method is no longer invoked.

5. The client computer system of claim 1 wherein the compressor compresses the selected method when in the run-time memory is needed but not available.

6. The client computer system of claim 5 further comprising:

a least recently invoked list that lists those of the methods that are currently not invoked in order of least recently invoked method to most recently invoked method:

the selected method is the least recently executed method in the least recently executed list that is not compressed when space in the run-time memory is needed but not available.

7. The client computer system of claim 1 wherein the run-time memory is a random access memory.

8. The client computer system of claim 1 wherein:

the methods include methods in architecture neutral code that is independent of the architecture of the client computer system; and the client computer system further comprises a virtual machine module that (A) includes the execution controller, (B) runs on the client computer system, and (C) enables execution of the methods in architecture neutral code.

9. The client computer system of claim 1 wherein the methods include methods in architecture specific code for the specific architecture of the client computer system.

10. The client computer system of claim 1 wherein the compressor flushes from the run-time the selected method when the selected method is compressed and further space in the run-time memory is needed but not available.

11. The client computer system of claim 1 further comprising:

a secondary memory;

the compressor (A) stores in the secondary memory the selected method when the selected method is compressed and further space in the run-time memory is needed but not available, and (B) retrieves from the secondary memory the selected method when the selected method is to be decompressed.

12. In a computer network over which is provided programs with methods, a method of executing the programs on a client computer system with reduced run-time memory space requirements, the method comprising the steps of:

receiving the methods at the client computer system from the computer network;

loading the methods into available space in a run-time memory of the client computer system when the methods are received;

executing the programs on the client computer system, whereby the methods are invoked and not invoked at different times;

compressing in the run-time memory a selected method of the methods that is not invoked and not compressed, whereby space is made available in the run-time memory; and decompressing into available space in the run-time memory the selected method is compressed so that the selected method may be invoked.

13. The method of claim 12 wherein the decompressing step includes decompressing the selected method as soon as the selected method is to be invoked.

14. The method of claim 12 wherein the decompressing step includes decompressing the selected method after a predetermined time interval.

15. The method of claim 12 wherein the compressing step includes compressing the selected method as soon as the selected method is no longer invoked.

16. The method of claim 12 wherein the compressing step includes compressing selected method when space in the run-time memory is needed but not available.

17. The method of claim 16 further comprising the steps of:

providing a least recently invoked list that lists those of the methods that are currently not invoked in order of least recently invoked method to most recently invoked method;

the selected method is the least recently invoked method in the least recently invoked list that is not compressed when space in the run-time memory is needed but not available.

18. The method of claim 12 wherein the run-time memory is a random access memory.

19. The method of claim 11 wherein the methods include methods in architecture neutral code that is independent of the architecture of the client computer system and the method further comprises the step of using a virtual machine module that runs on the client computer system to enable execution of the methods in architectural neutral code.

20. The method of claim 12 wherein the methods include methods in architecture specific code for the specific architecture of the client computer system.

21. The method of claim 12 further comprising the step of flushing from the run-time memory the selected method when the selected method is compressed and further space in the run-time memory is needed but not available.

22. The method of claim 12 further comprising the steps of:

storing in a secondary memory of the client computer system the selected method when the selected method is compressed and further space in the run-time memory is needed but not available; and retrieving from the secondary memory the selected method when the selected method is to be decompressed.

23. A computer program product for use with a client computer system in a computer network over which is provided programs with methods, the client computer system including a network communications interface to receive the methods of the programs and a run-time memory to execute the programs, the computer program product comprising a computer readable storage medium and a computer program mechanism embedded therein, the computer program mechanism comprising:

a network communications manager that loads the methods into available space in the run-time memory when the methods are received;

an execution controller that controls execution of the programs, whereby the methods are invoked and not invoked at different times;

a compressor that (A) compresses in the memory a selected method of the methods that is not invoked and not compressed, whereby space is made available in the run-time memory, and (B) decompresses into available space in the run-time memory the selected method when the selected method is compressed so that the selected method may be invoked.

24. The computer program product of claim 23 wherein the compressor decompresses the selected method as soon as the selected method is to be invoked.

25. The computer program product of claim 23 wherein the compressor decompresses the selected method after a predetermined time interval.

26. The computer program product of claim 23 wherein the compressor compresses the selected method as soon as the selected method is no longer invoked.

27. The computer program product of claim 23 wherein the compressor compresses the selected method when space in the run-time memory is needed but not available.

28. The computer program product of claim 27 further comprising:

a least recently invoked list that lists those of the methods that are currently not invoked in order of least recently invoked method to most recently invoked method;

the selected method is the least recently invoked method in the least recently invoked list that is not compressed when space in the run-time memory is needed but not available.

29. The computer program product of claim 23 wherein the run-time memory is a random access memory.

30. The computer program product of claim 23 wherein:

the methods include methods in architecture neutral code that is independent of the architecture of the client computer system; and the computer program mechanism further comprises a virtual machine module that (A) includes the execution controller, (B) runs on the client computer system, and (B) enables execution of the methods in architecture neutral code.

31. The computer program product of claim 23 wherein the methods include methods in architecture specific code for the specific architecture of the client computer system.

32. The computer program product of claim 23 wherein the compressor flushes from the run-time memory the selected method when the selected method is compressed and further space in the run-time memory is needed but not available.

33. The computer program product of claim 23 wherein:

the client computer system further includes a secondary memory;

the compressor (A) stores in the secondary memory the selected method when the selected method is compressed and further space in the run-time memory is needed but not available, and (B) retrieves from the secondary memory the selected method when the selected method is to be decompressed.

\* \* \* \* \*